United States Patent [19]
Giannuzzi

[11] Patent Number: 5,267,423
[45] Date of Patent: * Dec. 7, 1993

[54] SELF-DRILLING ANCHOR AND BEARING PLATE ASSEMBLY

[76] Inventor: Louis N. Giannuzzi, 59 Dingletown Rd., Greenwich, Conn. 06830

[ * ] Notice: The portion of the term of this patent subsequent to Aug. 16, 2005 has been disclaimed.

[21] Appl. No.: 642,035

[22] Filed: Jan. 16, 1991

Related U.S. Application Data

[63] Continuation-in-part of Ser. No. 396,109, Aug. 21, 1989, Pat. No. 5,039,262, which is a continuation-in-part of Ser. No. 215,307, Jul. 5, 1988, Pat. No. 4,892,429, which is a continuation-in-part of Ser. No. 81,016, Aug. 3, 1987, Pat. No. 4,763,456.

[51] Int. Cl.$^5$ .................. E04D 5/14; F16B 25/10
[52] U.S. Cl. ............................. 52/410; 411/387; 411/417; 411/533
[58] Field of Search ............... 52/410, 408, 506; 411/311, 417, 418, 531, 533, 386, 387, 185, 187, 188, 189

[56] References Cited

U.S. PATENT DOCUMENTS

| | | | |
|---|---|---|---|
| 4,250,674 | 2/1981 | Feist | 52/508 |
| 4,726,164 | 2/1988 | Reinwall et al. | 52/410 |
| 5,069,589 | 12/1991 | Lemke | 52/410 |
| 5,102,275 | 4/1992 | Hulsey | 411/533 |

Primary Examiner—Michael Safavi
Attorney, Agent, or Firm—Michael Ebert

[57] ABSTRACT

A self-drilling anchor and bearing plate assembly adapted to secure a membrane or other layer onto a roof deck or a similar substrate formed of a material that requires a drilled hole to receive the anchor. The bearing plate which rests on the layer and includes barbs which press into the layer to resist rotation of the plate, has an opening therein to accommodate the anchor, the opening being surrounded by a series of ratchet teeth. The anchor head is provided with at least one pawl which when the head overlies the plate is then in operative relation with the ratchet teeth. Extending from the head is a shank section in an auger formation, and extending from the shank section is a drill section having at least one cutting blade. When the anchor is inserted in the plate opening and is turned in by a tool, the drill section then proceeds to drill a hole in the substrate, and as the shank section enters this hole, its auger taps an internal thread in the hole to securely retain the anchor therein. When the anchor reaches the point where its head rests on the plate, then further turning in of the anchor to urge the plate against the layer causes the pawl to ride over the ratchet teeth, thereby permitting further turning in. But should the anchor thereafter seek to turn out, the pawl then engages the ratchet teeth to resist this motion and prevent loosening of the installed assembly.

18 Claims, 4 Drawing Sheets

SELF-DRILLING ANCHOR AND BEARING PLATE ASSEMBLY

RELATED APPLICATION

This application is a continuation-in-part of my copending application Ser. No. 396,109, filed Aug. 21, 1989, now U.S. Pat. No. 5,039,262 entitled "Self-Drilling Wall Anchor," which in turn is a continuation-in-part of my earlier application Ser. No. 215,307, filed Jul. 5, 1988, entitled "Roof Anchor and Stress Plate Assembly" (now U.S. Pat. No. 4,892,429), which in turn is a continuation-in-part of a still earlier application Ser. No. 081,016, filed Aug. 3, 1987 having the same title (now U.S. Pat. No. 4,763,456). The entire disclosures of these related cases are incorporated herein by reference.

BACKGROUND OF INVENTION

1. Field of Invention

The invention relates generally to an anchor and bearing plate assembly for fastening a membrane or other layer to the deck of a roof or a similar substrate, and more particularly to an assembly of this type whose anchor includes a drill section extending from an auger-type shank section so that the anchor is usable with a deck formed of a material that resists entry therein of an auger and therefore requires a drilled hole in the material to receive the anchor.

2. Status of Prior Art

It is common practice to cover the roof of a building with a layer of thermal insulation formed of pads or panels of lightweight material such as fiberglass or rigid foam plastic. These panels are laid down on the roof deck and covered by a sheet of polyvinyl chloride, or other water-impermeable membrane to protect the layer against water penetration.

Since the roof is exposed to the elements, it may on occasion be subject to high velocity winds as high as 150 miles per hour. Unless the insulation and membrane layer are firmly secured in place, the resultant updraft may blow the layer off the roof. For various reasons, the use of bonding agents to adhere the insulation layer to the deck of the roof is now being replaced by mechanical fasteners which serve to retain the layer in place when strong winds are encountered. The present practice of securing the insulation layer to the roof deck is by means of load-bearing plates of sheet metal which overlie the insulation layer and are bolted or otherwise mechanically fastened to the deck.

Among the patents which disclose load-bearing or stress plates for this purpose are the Giannuzzi U.S. Pat. No. 4,574,551, The Williams U.S. Pat. No. 1,286,862, the Sandquist U.S. Pat. No. 4,074,501 and the Carlson U.S. Pat. No. 4,288,951.

While the usual practice, when a roof deck is covered by an insulation layer, is to face this layer with a thin, waterproof membrane to prevent water seepage into the insulation layer, in many situations, use is made only of a waterproofing layer or membrane to cover the roof deck, in which case the anchor and bearing plate assembly serves to fasten the membrane to the roof deck. The present invention is applicable to both situations.

My prior U.S. Pat. No. 4,763,456 discloses an anchor and stress plate assembly adapted to secure an insulation layer to the deck of a roof formed either of relatively soft or hard decking material. The anchor is provided with a flanged head and a shank whose leading section takes the form of an auger screw having a root which tapers toward the tip and a threading spiralled about the root whose crests are of approximately uniform diameter. When the anchor is turned into pulverizable decking material, the tapered root of the auger screw then acts to pack particles of this material into a dense mass in the region surrounding the screw to enhance the holding power of the anchor.

In hard decking material, a hole must first be drilled therein to receive the auger screw whose root when the anchor is turned in, fits within the hole and whose crests then tap a thread in the hole wall to securely retain the anchor. The stress plate which overlies the insulation layer to prevent uplift thereof has a central depression surrounding an opening defined by a circular series of ratchet teeth. When the anchor is fully turned into the decking material, its head then lies within the plate opening and the flange on the head rests within the depression. The anchor head is provided with a pawl that is deflected by the ratchet teeth when the anchor is being turned in, the pawl engaging the teeth when the anchor seeks to turn out, thereby preventing loosening of the installed assembly. The anchor and stress bearing plate assembly disclosed in my prior U.S. Pat. No. 4,763,456 is usable with soft decking material, such as porous wood and fiber composites known commercially as Tectum. In the case of soft decking material, the auger screw of the anchor turns into this material without difficulty. The same assembly is also usable with hard decking material such as gypsum, plaster board to pre-drill a hole in the material before the anchor to tap this hole to internally thread its wall and thereby retain the anchor in the hole.

The main concern of this invention is with a roof anchor and bearing or stress plate assembly adapted to secure a protective membrane or an insulation layer covered by this membrane to a roof deck or similar substrate made of medium-hard material, such as wooden chip board, structural composite board, water board or oriented wood-strand board. Medium-hard material has sufficient hardness to resist the turning in thereto of an auger type anchor such as those disclosed in my prior U.S. Pat. Nos. 4,763,456 and 4,892,429. Hence to use these anchors with a medium-hard roof deck, it would be necessary to first drill a hole in the deck.

This requirement complicates the installation procedure, for the installer of the assembly would first have to run a drill bit through the medium-hard roof deck before installing the assembly. The amount of time consumed in drilling operations in situations where thousands of assemblies must be installed would add substantially to installation costs.

In my copending application Ser. No. 396,109, there is disclosed a self-drilling anchor having a head adapted to receive a screwdriver or other torque-producing tool, the anchor including an externally-threaded shank section functioning as an auger and a drill section extending from the shank section formed by a pair of opposed cutting blades and a pair of guide blades, each angled relative to a respective cutting blade. When this anchor is turned into a substrate, the cutting blades guided by the guide blades proceed to bore a hole in the substrate, and when the shank section enters this hole, the hole is tapped by the threading of the shank section, thereby retaining the anchor in place.

But while an anchor of the type disclosed in my copending application Ser. No. 396,109 is usable for installation in medium-hard and hard substrates, it is not suitable for use in combination with a stress or bearing plate having a circular series of ratchet teeth surrounding the opening in the plate, for this anchor lacks a pawl to engage these teeth to prevent turning out of the anchor and loosening of the installed assembly.

Of prior art interest in regard to anchors having a drilling section is the patent to Ernst et al., U.S. Pat. No. 4,601,625.

SUMMARY OF INVENTION

In view of the foregoing, the main object of this invention is to provide a self-drilling anchor and bearing plate assembly adapted to fasten a membrane or another layer of material, such as an insulation layer, to a roof deck or similar substrate formed of a material of sufficient hardness to require that a hole be drilled therein to receive the anchor. While the assembly is especially useful for installation in roof decks or similar substrates formed of medium-hard material, in practice it may also be used for hard substrates which are drillable.

A significant advantage of the invention is that it obviates the need for pre-drilling of the substrate and facilitates fast and easy installation of the assembly.

More particularly, an object of the invention is to provide an assembly of the above type having a bearing plate which when pressed by the anchor against the membrane or other layer to be secured to the substrate is then resistant to rotation relative to the membrane, and in which the anchor, when installed with its head pressed against the bearing plate, is then resistant to being turned out, as a consequence of which the installed assembly is highly stable.

Also an object of this invention is to provide an assembly of the above type which may be mass-produced at relatively low cost and which can be installed without difficulty by a simple torque-producing tool.

Briefly stated, these objects are attained in a self-drilling anchor and bearing plate assembly adapted to secure a membrane or other layer onto a roof deck or a similar substrate formed of a material that requires a drilled hole to receive the anchor. The bearing plate which rests on the layer and includes barbs which press into the layer to resist rotation of the plate, has an opening therein to accommodate the anchor, the opening being surrounded by a series of ratchet teeth. The anchor head is provided with at least one pawl which when the head overlies the plate is then in operative relation with the ratchet teeth. Extending from the head is a shank section in an auger formation, and extending from the shank section is a drill section having at least one cutting blade.

When the anchor is inserted in the plate opening and is turned in by a tool, the drill section then proceeds to drill a hole in the substrate, and as the shank section enters this hole, its auger taps an internal thread in the hole to securely retain the anchor therein. When the anchor reaches the point where its head rests on the plate, then further turning in of the anchor to press the plate against the layer causes the pawl to ride over the ratchet teeth thereby permitting further turning in. But should the anchor thereafter seek to turn out, the pawl then engages the ratchet teeth to resist this motion and thereby prevent loosening of the installed assembly.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

The Assembly

Figures 1, 4, 6:
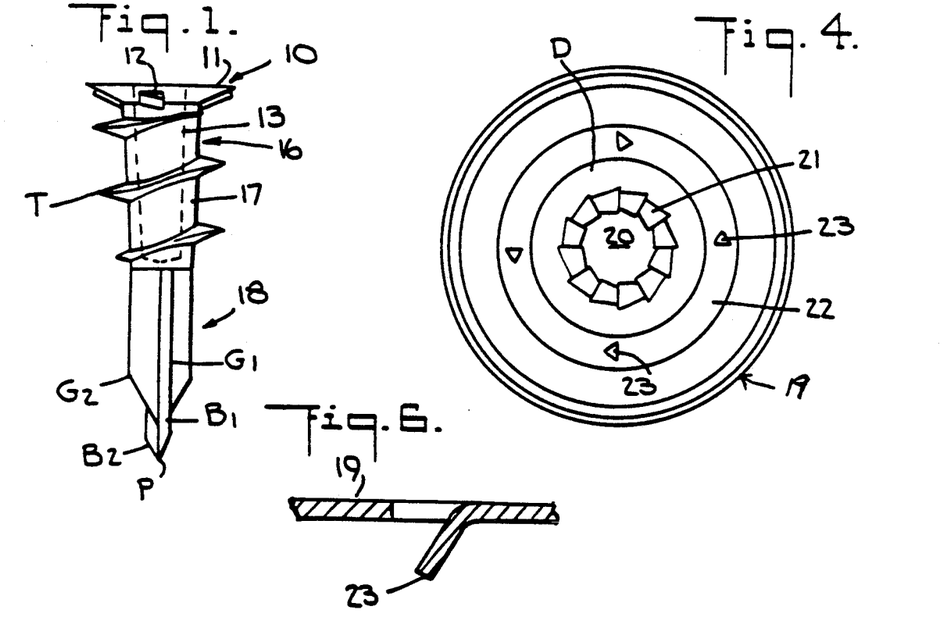
FIG. 1 is an elevation view of the anchor included in an assembly in accordance with the invention.
FIG. 4 is a top view of the bearing plate included in the assembly.
FIG. 6 is a section taken through a small portion of the bearing plate that includes a barb.
Figures 2, 3, 5, 7:
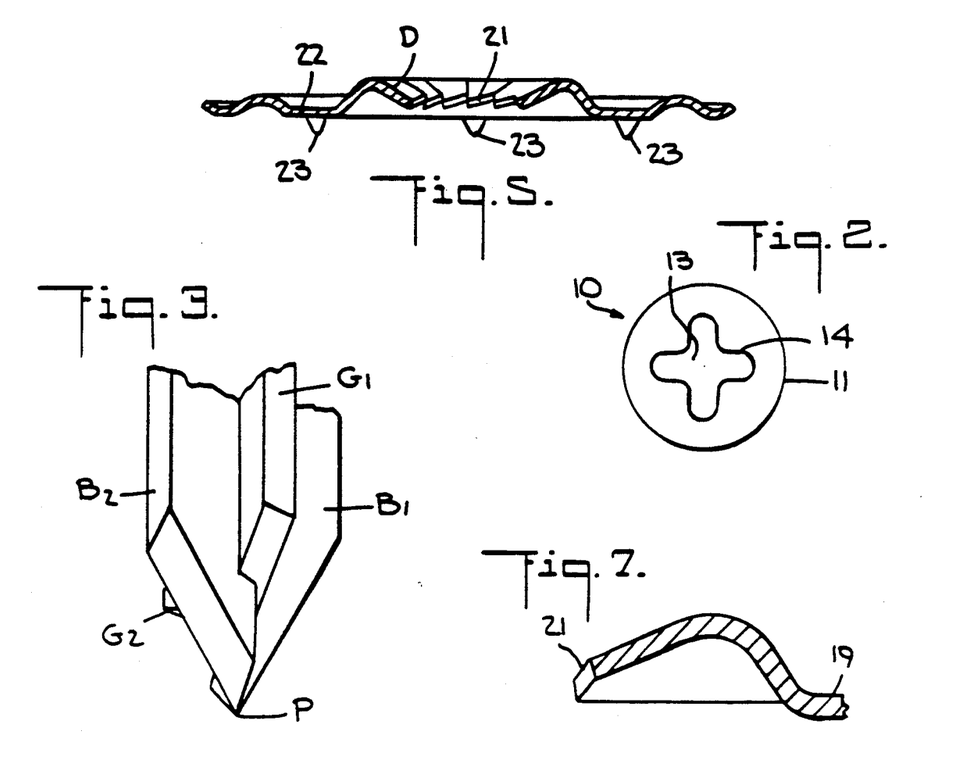
FIG. 2 is a top view of the anchor.
FIG. 3 is a magnified view of the lower portion of the drill section of the anchor.
FIG. 5 is a section taken through the diameter of the bearing plate.
FIG. 7 is a section taken through a small portion of the bearing plate that includes a ratchet tooth.

Referring now to FIGS. 1 to 3, there is shown the self-drilling anchor, generally designated by numeral 10, included in an anchor and bearing or stress plate assembly in accordance with the invention. Anchor 10 may be molded or otherwise fabricated of a corrosion-resistant zinc alloy or other suitable metal, or of a high-strength synthetic plastic material such as nylon reinforced with long glass fibers to provide a moldable composite.

Anchor 10 includes an enlarged head 11 having a truncated conical form, a series of fingers or pawls 12 being formed on the inclined wall of the head. An axial cavity 13 extending through head 11 and having a cruciform cross section or other suitable shape acts as a socket 14 to receive a similarly shaped blade of a torque producing tool (see tool 15 in FIG. 8) such as a Phillips-type screwdriver or a conventional manually-driven or motor-powered screw driver.

Anchor 10 further includes a shank section 16 extending axially from head 11. Shank section 16 takes the form of an auger screw whose root 17 tapers from its junction with head 11 to its junction with a drill section 18 extending axially from shank section 16.

Spiralled about root 17 is a threading T whose crests are of substantially uniform diameter throughout the length of the shank section. The relationship of the threading to the root, as pointed out in my above-identified prior patents which also disclose a tapered root, is such as to cause material pulverized by the auger as the shank section is turned into a substrate, to create a densified mass surrounding this section to resist withdrawal of the anchor from the substrate.

Drill section 18, as best seen in FIG. 3, is provided with a pair of cutting blades $B_1$ and $B_2$. These extend in opposite directions from the longitudinal axis of the drill section 18 so that the cutting edges of the blades are diametrically opposed and act to cut a hole in the substrate when the anchor is turned therein by a tool. At right angles to the respective cutting blades $B_1$ and $B_2$ is a pair of guide blades $G_1$ and $G_2$ which engage the wall of the hole being drilled to ensure circularity thereof. In practice, the outer ends of cutting blades $B_1$ and $B_2$ are made convex to conform to the curvature of the hole wall and to sweep this wall as the drill section is turned in.

The lower ends of the cutting and guide blades are chamfered. Cutting blades $B_1$ and $B_2$ are somewhat longer than guide blades $G_1$ and $G_2$ to define a triangular point P. Thus when the anchor is pressed down on a membrane-covered substrate, point P penetrates therein, and as the anchor is then turned in by a tool, a hole is bored in the substrate by the cutting blades as guided by the guide blades to ensure the formation of a round hole.

Bearing plate 19, as shown in FIGS. 4 to 7, is preferably formed of rust-resistant sheet metal, such as a zinc alloy. The plate has a circular form and is provided with corrugations concentric with a central circular opening 20 surrounded by a circular series of ratchet teeth 21. The ratchet teeth lie within a concave depression D whose dimensions are such as to receive head 11 of the anchor. Also formed in the anchor is an annular depressed region 22.

The concentric corrugations in the plate render the plate resistant to flexure. Struck out of plate 19 in region 22 at equi-spaced positions are four pointed prongs or barbs 23. These barbs project below the plate and press into or penetrate the membrane when plate 19 is secured thereto by the anchor. The barbs act to resist rotation of the plate.

Depending on the nature of the membrane or layer being secured to the deck, it is sometime necessary to prevent the bearing plate from rotating or being otherwise displaced while the anchor is being installed. To this end, the tool used to turn the anchor, such as an electric screwdriver, may be provided with a spring-biased depressible holding plate having an opening therein for the screwdriver blade. This holding plate presses against the bearing plate to hold it in place as the anchor is being turned into the substrate by the tool.

Installation Procedure

Figure 8:
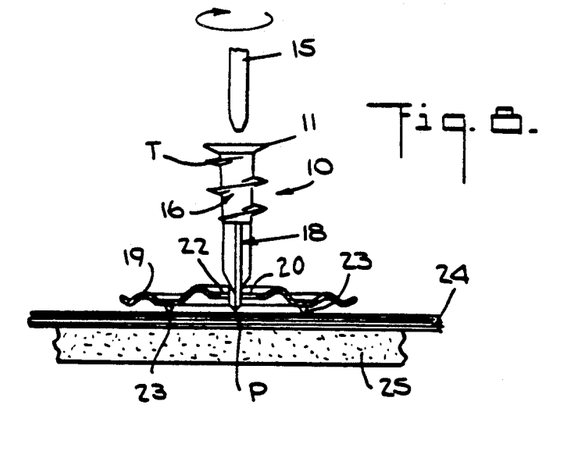
FIG. 8 illustrates the first step of the procedure for installing the assembly on a roof deck or a similar substrate covered by a membrane or other layer.
Figure 9:
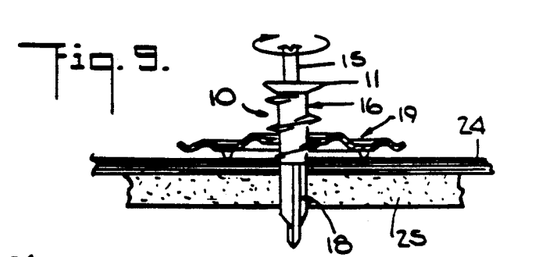
FIG. 9 shows the second step in which the drill section drills a hole in the layer and substrate to receive the shank section of the anchor.
Figure 10:
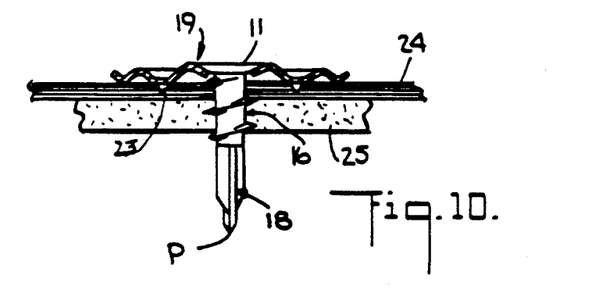
FIG. 10 shows the final step in this procedure in which the shank section threadably engages the hole drilled in the substrate.

FIGS. 8 to 10 illustrate the procedure by which a membrane 24 or other layer covering a roof deck 25 or a similar substrate formed of medium hard or hard drillable material is fastened to this substrate by an anchor and bearing plate assembly in accordance with the invention.

In the first step, as shown in FIG. 8, bearing plate 19 is placed atop membrane 24 at a desired location, and the tip P of drill section 18 is inserted in opening 20 in the stress plate. The blade of tool 15 is then inserted in the mating socket in head 11 of the anchor.

The tool is now rotated clockwise, as shown in FIG. 9, to cause drill section 18 to drill a hole in substrate 25. As the tool continues to be turned, the auger-type shank section 16 then proceeds to tap its way through the hole to create an internal threading on the wall of the hole which acts to retain the anchor thereon. The installation is completed when head 11, as shown in FIG. 10, lies within depression D in bearing plate 19 and presses the plate against membrane 24 so that the barbs 23 on the underside of the plate press into or penetrate the membrane and thereby prevent rotation of the plate.

In the final phase of installation, when head 11 of the anchor lies within the concave depression D of the bearing plate, then the pawls 12 are in operative relation to the ratchet teeth 21 surrounding the circular opening of the plate. As one continues to turn in the anchor to firmly press its head against the bearing plate and thereby urge this plate against the membrane to be fastened, pawls 12 ride over the ratchet teeth; hence in the clockwise direction of anchor rotation, the pawls do not impede such turning. Where the anchor material is such that the pawls are flexible, they are deflected by the ratchet teeth and thereby ride over the teeth. Where the pawls are inflexible, then the pawls press the plate into the membrane therebelow so that they can ride over the teeth.

But should vibration or other forces thereafter seek to turn the anchor out counterclockwise, pawls 12 are then engaged by the ratchet teeth of the bearing plate to prevent rotation of the anchor relative to the bearing plate. And because the bearing plate is prevented by its barbs 23 from rotating, the anchor is not permitted to turn counterclockwise, and the installation cannot be loosened.

Modified Assembly

In the assembly shown in FIGS. 8 to 10, the length of anchor 10 relative to the combined thickness of membrane 24 and substrate 25 are such that when the assembly is fully installed, drill section 18 then projects below substrate 25, while the auger-type shank section 16 lies within the substrate, thereby maximizing the holding power of the anchor.

Figure 11:
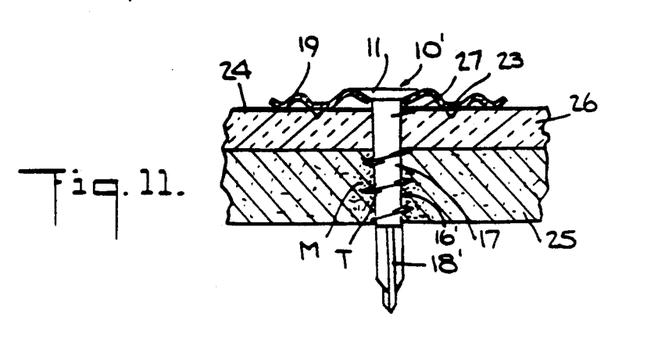
FIG. 11 shows a modified form of assembly in accordance with the invention adapted to secure a membrane covered insulation layer to a substrate.

In a situation where, as shown in FIG. 11, roof deck 25 is covered by a relatively thick and soft insulation layer 26 which in turn is covered by the thin waterproofing membrane 24, the anchor shown in the previous figures would be unsuitable for this application, for the shank section which provides the holding power would then be mainly within the soft insulation layer.

In order, therefore, to provide an anchor having a length suitable for this application, the anchor 10' shown in FIG. 11 has an elongated shank section, the upper portion 27 which is free of threading and is of uniform diameter, the lower portion 16' having a tapered root and threading of substantially uniform diameter, as in the other embodiment of the anchor, as well as a drill section 18' as before.

The length of anchor 10', as shown in FIG. 11, relative to the combined thickness of membrane 24, insulation layer 26 and substrate 25 is such that the upper portion 27 of uniform diameter of shank section 16 lies within the membrane and insulation layer, while the lower auger-type portion 16' of the shank section lies within substrate 25 and the drill section 18' extends beyond the substrate.

It will be seen in FIG. 11 that surrounding the threaded shank portion 16' is a densified mass M of particles, resulting from the packing action produced by its tapered root and its substantially uniform diameter threading T.

Thus in both embodiments of the self-drilling anchor and bearing plate assembly, the anchor acts to pre-drill its own hole in the substrate, and to then tap this hole, the anchor after engaging the stress-distributing bearing plate becoming locked in place whereby the installed assembly cannot be loosened by vibratory or other forces seeking to turn out the anchor.

The assembly affords maximum pull out strength, for the packing and densifying of the substrate about the shank section in conjunction with the deep-reaching threads of this section give rise to an exceptional holding power. And the drill section, which includes guide blades, ensures a round hole, and this, too, enhances the holding power of the anchor.

It is to be noted that in order to simplify the drawing, the ratchet teeth surrounding the opening of the bearing plate and the cooperating fingers in the anchor head have been omitted in FIGS. 8 to 11. In practice, however, these elements are included to prevent loosening of the installed assembly.

Modified Drill Section

In the drill section of the anchor shown in FIG. 3, cutting blades $B_1$ and $B_2$ are provided with longitudinally-extending cutting edges which when the drill section is turned in,, act to drill a hole in the roofing deck, whereas guide blades $G_1$ and $G_2$ perform no cutting function, for they are adapted to engage the wall of the hole as it is being drilled to ensure its circularity.

The lower ends of both the cutting blades and the guide blades are chamfered so that, as shown in FIG. 3, these ends are upwardly inclined relative to the axis of the drill section. However, cutting blades $B_1$ and $B_2$ are somewhat longer than guide blades $G_1$ and $G_2$ so that the upwardly inclined ends thereof define a triangular point P.

Because the membrane which covers the roofing deck is usually made of rubber or other elastomeric material, an anchor drill section of the type shown in FIG. 3 does not physically cut a hole in the membrane whose diameter corresponds to the diameter of the hole drilled in the roofing deck. As a consequence, the membrane tends to cluster or bunch about the shank of the anchor in the installed assembly, thereby making it difficult to end up with a wrinkle-free assembly.

To overcome this drawback, a modified drill section is provided which is adapted to slice away the membrane in the region entered into by the anchor so as to provide a clean, wrinkle-free installation.

Figure 12:
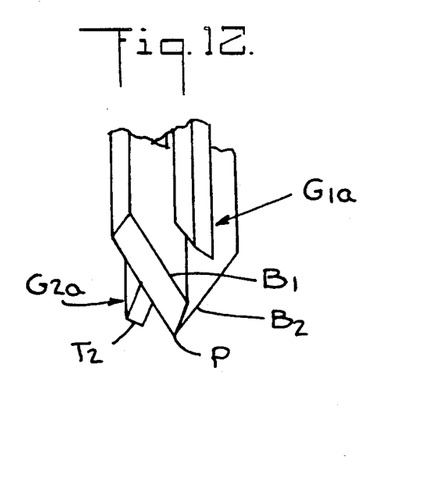
FIG. 12 illustrates a modified drill section for the anchor shown in FIG. 1.

The modified drill section, as shown in FIG. 12, includes a pair of cutting blades $B_1$ and $B_2$ identical to those shown in FIG. 3, and a pair of guide blades $G_{1a}$ and $G_{2a}$ which are the same as guide blades $G_1$ and $G_2$ in FIG. 3, except for one important detail. In this instance, the ends of guide blades $G_{1a}$ and $G_{2a}$ are downwardly inclined with respect to the axis of the drill section to define sharp slicing tips $T_1$ and $T_2$.

When the drill section is turned into the membrane-covered roofing deck, tips $T_1$ and $T_2$, when they engage the membrane, act to slice it away in the region entered into by the anchor, thereby avoiding bunching or deformation of the membrane to provide a winkle-free installation.

Modified Shank Section

To resist unscrewing of the anchor, in the embodiment of the assembly shown in FIGS. 1 and 4, the anchor is provided on its head with pawls or fingers 12 which engage ratchet teeth 21 surrounding the opening of the bearing plate.

Figure 13:
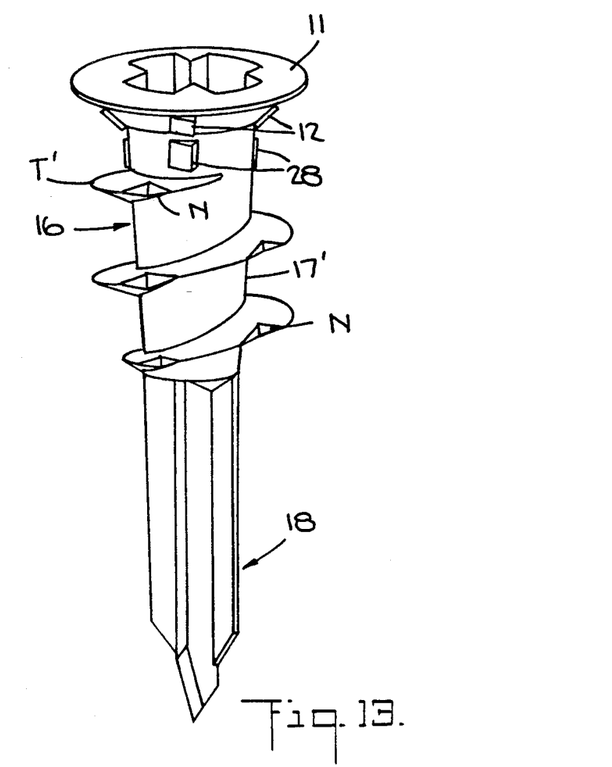
FIG. 13 illustrates an anchor of the type shown in FIG. 1 with a modified shank section.

To further enhance resistance to loosening of the anchor, in the modified version thereof shown in FIG. 13, the tapered root 17' of the shank section 16' which generally correspond to the tapered root 17 of shank section 16 in FIG. 1, just below the head 11 of the anchor root 17' is provided with one-way external teeth 28. When during installation of the assembly the anchor is turned into a roofing deck or other substrate, teeth 28 then slip over the hole surface of the substrate. But should the anchor, as a result of vibratory or other forces, thereafter seek to turn out and loosen, teeth 28 will then bite into the substrate material to resist unloosening of the anchor.

The threading T' of uniform diameter spiralled about the tapered root 16' is provided with triangular notches N. These notches, in certain materials, serve to assist the shank section in tapping the hole drilled in the substrate by the drill section of the anchor. The notches also serve to enhance resistance to unscrewing of the installed anchor.

Anti-Rotation Assembly

Figure 14:
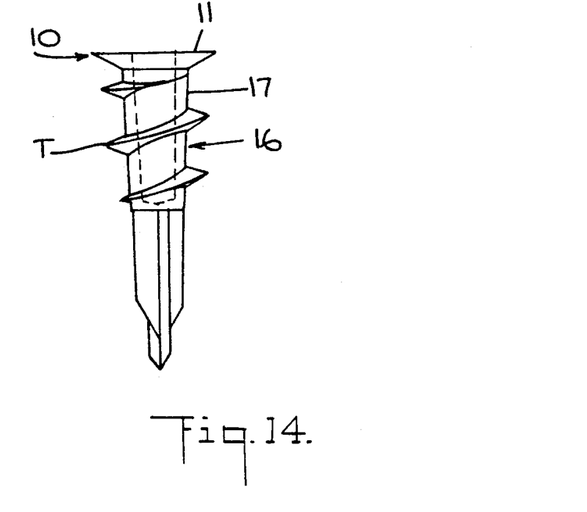
FIG. 14 shows an anchor for use in an anti-rotating assembly.
Figure 15:
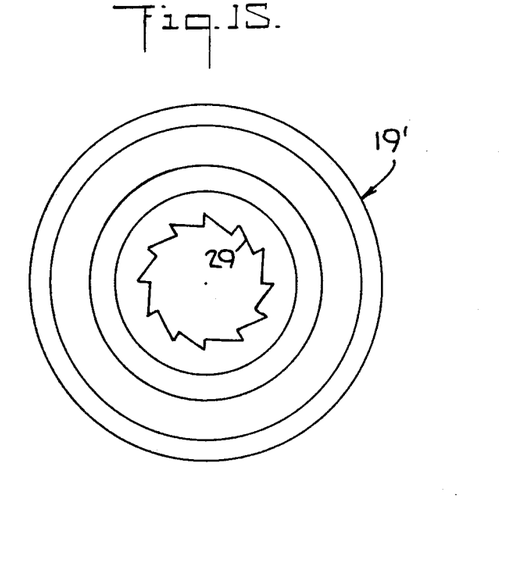
FIG. 15 is a plan view of the bearing plate in the anti-rotation assembly.
Figure 16:
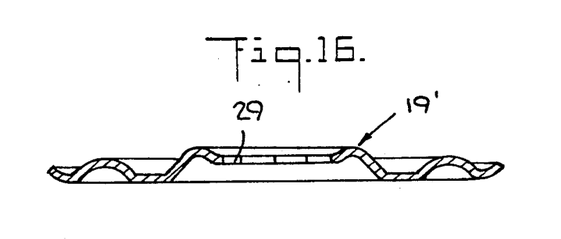
FIG. 16 is a section taken through the plate shown in FIG. 15.

In the anti-rotation assembly shown in FIGS. 14, 15 and 16, the anchor 10' is the same as anchor 10 in FIG. 1, except that no pawls or fingers are provided on head 11. And there are no ratchet teeth as in bearing plate 19 in FIG. 4; for as shown in FIGS. 15 and 16, the opening in bearing plate 19' is defined by a series of forwardly projecting teeth 29.

When, therefore, the anchor 10' which passes through the opening in bearing plate 19' is turned in and its head rests in the concave depression surrounding the opening in the bearing plate, the length of teeth 29 are such that the teeth seek to dig into the tapered shank 17 in the region thereof just under head 11, thereby resisting rotation of the anchor and preventing loosening of the assembly.

Reverse Ratchet Assembly

In the assembly shown in FIGS. 1 and 4, pawls or fingers on the head of anchor 10 engage ratchet teeth surrounding the opening in bearing plate 19.

Figure 17:
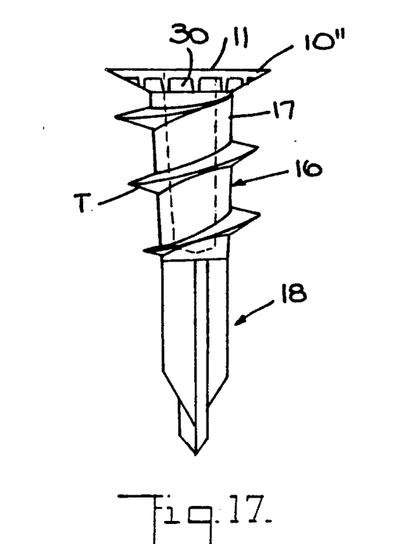
FIG. 17 shows an anchor for use in a reverse ratchet assembly.
Figure 18:
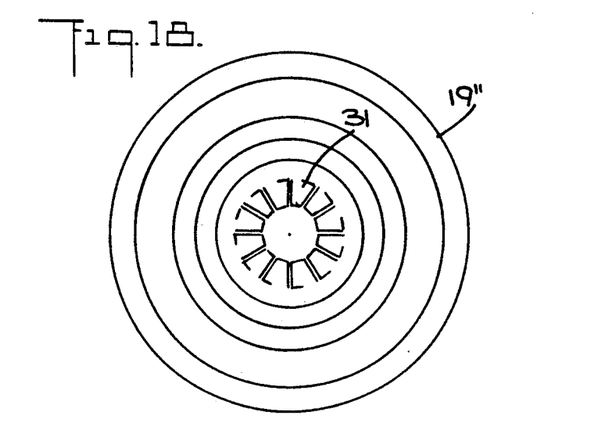
FIG. 18 is a plan view of the bearing plate used in the reverse ratchet assembly.
Figure 19:
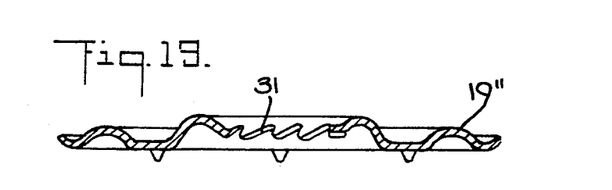
FIG. 19 is a section taken through the plate shown in FIG. 18.

A reverse ratchet assembly is shown in FIGS. 17, 18 and 19, where it will be seen that the underside of the head 11 of anchor 10" is provided with a circular series of indentations or recesses 30. These recesses are engaged by a circular series of ratchet teeth 31 surrounding the opening in bearing plate 19" which match the recesses.

Thus when the anchor is inserted in the opening in the plate and turned in until the head of the anchor lies within the concave depression in the bearing plate, further clockwise turning in of the anchor to press the plate against the substrate causes the ratchet teeth to slip over the recesses. But should the anchor thereafter seek to turn out and thereby loosen the installed assembly, this is prevented by the ratchet teeth whose orientation relative to the matching recesses is such as to resist counterclockwise movement.

Lock Washer Assembly

Figure 20:
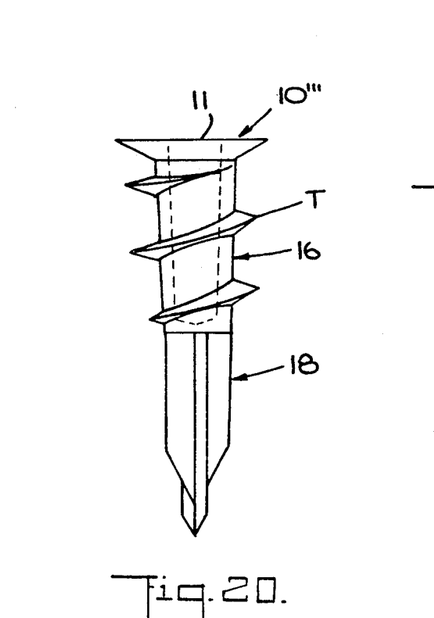
FIG. 20 shows an anchor for use in a lock-washer type assembly.
Figure 21:
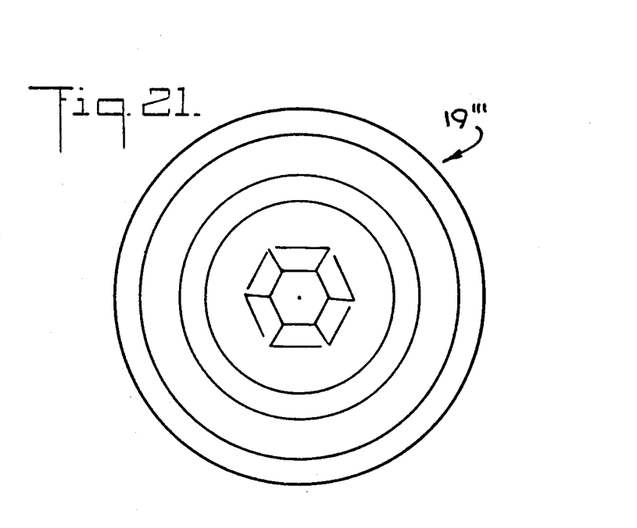
FIG. 21 is a plan view of the plate used in the lock-washer type assembly.

In the self-drilling anchor & bearing plate assembly shown in FIGS. 20, 21, and 23, the anchor 10''' is the same as anchor 10 in FIG. 1, except that no pawl or finger is provided on head 11. Bearing plate 19''' in this instance differs from bearing plate 19 in FIG. 4, in that provided around its opening is a series of upwardly protruding spring-like fingers 32 very much like those found in a lock washer.

Reverse Ratchet Assembly

In the assembly shown in FIGS. 1 and 4, pawls or fingers on the head of anchor 10 engage ratchet teeth surrounding the opening in bearing plate 19.

A reverse ratchet assembly is shown in FIGS. 17, 18 and 19, where it will be seen that the underside of the head 11 of anchor 10'' is provided with a circular series of ratchet indentations or recesses 30. These recesses are engaged by a circular series of teeth 31 surrounding the opening in bearing plate 19'' which match the recesses.

Thus when the anchor is inserted in the opening in the plate and turned in until the head of the anchor lies within the concave depression in the bearing plate, further clockwise turning in of the anchor to press the plate against the substrate causes the teeth to slip over the ratchet recesses. But should the anchor thereafter seek to turn out and thereby loosen the installed assembly, this is prevented by the ratchet recesses whose orientation relative to the matching teeth is such as to resist counterclockwise movement.

Lock Washer Assembly

In the self-drilling anchor & bearing plate assembly shown in FIGS. 20, 21, and 23, the anchor 10''' is the same as anchor 10 in FIG. 1, except that no pawl or finger is provided on head 11. Bearing plate 19''' in this instance differs from bearing plate 19 in FIG. 4, in that provided around its opening is a series of upwardly protruding spring-like fingers 32 very much like those found in a lock washer.

Figure 22:
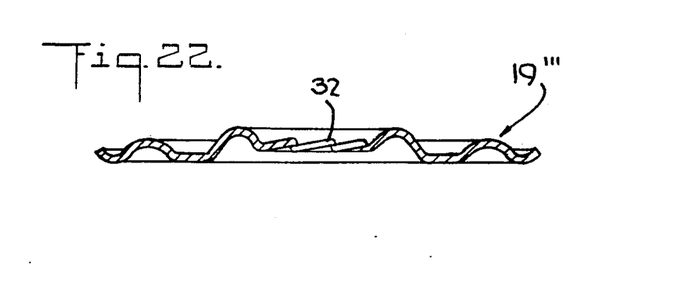
FIG. 22 is a section taken through the plate shown in FIG. 21.

Hence when anchor 10''' is turned in and its head 11 is seated in the concave depression surrounding the opening in the bearing plate 19''', then the underside of the head 11 is engaged by the fingers 31 and the anchor is prevented from turning in the manner of a lock washer.

While there have been shown and described preferred embodiments of a self-drilling anchor and bearing plate assembly in accordance with the invention, it will be appreciated that many changes and modifications may be made therein without, however, departing from the essential spirit thereof.

I claim:

1. A self-drilling anchor and bearing plate assembly adapted to fasten a membrane or other layer onto a roof deck or a similar substrate formed of a drillable material, the assembly comprising:

(a) a bearing plate adapted to rest on the layer and having an opening therein; and
   (b) an anchor having a head engageable by a torque-producing tool to turn the anchor, an externally-threaded shank section extending from the head and a drill section extending from the shank section and having at least one cutting blade whereby when the anchor is inserted in the plate opening and turned in, the drill section proceeds to drill a hole in the substrate and when the shank section enters the hole, its thread taps the wall of the hole to securely retain the shank section therein, and when the anchor reaches a point where its head approaches the plate, then further turning in of the anchor urges the plate against the layer, said anchor being provided with means cooperating with the plate to resist counter rotation and turning out of the anchor and the resultant loosening of the assembly, said anchor being provided with at least one finger which cooperates with a series of ratchet teeth surrounding the opening of the plate to prevent loosening of the assembly.

2. An assembly as set forth in claim 1, wherein said bearing plate is provided with a concave depression surrounding the ratchet teeth to accommodate the head of the anchor.

3. An assembly as set forth in claim 1, wherein said head has the formation of a truncated cone.

4. An assembly as set forth in claim 1, wherein said head has a socket therein configured to receive the matching blade of a torque-producing tool.

5. An assembly as set forth in claim 1, wherein said shank section has a tapered root surrounded by said thread which has a substantially uniform diameter.

6. An assembly as set forth in claim 5, wherein said thread is notched.

7. An assembly as set forth in claim 1, wherein said drill section further includes at least one guide blade at an angle to said cutting blade to ensure circularity of drilled hole.

8. An assembly as set forth in claim 7, wherein the end of the guide blade is inclined upwardly relative to the axis of the drill section to define a slicing tip.

9. An assembly as set forth in claim 1, wherein said plate is provided at its underside with barbs which press into or penetrate the membrane to prevent rotation of the plate.

10. An assembly as set forth in claim 9, wherein said plate is made of corrosion-resistant metal and said barbs are struck out therefrom.

11. An assembly as set forth in claim 1, wherein said anchor is molded of fiberglass reinforced nylon.

12. An assembly as set forth in claim 1, wherein said anchor is formed of corrosion-resistant metal.

13. An assembly as set forth in claim 1, wherein the dimensions of said anchor relative to the combined thickness of the membrane and the substrate are such that when the assembly is fully installed, the shank section thereof lies within the substrate and the drill section extends beyond the substrate.

14. An assembly as set forth in claim 1, wherein said shank section is elongated and includes an upper unthreaded portion joined to said head and a lower threaded portion joined to said drill section.

15. An assembly as set forth in claim 14, for fastening a relatively thick insulation layer onto said substrate, the length of the anchor relative to the combined thickness of the insulation layer and the substrate being such that when the anchor is fully installed, the unthreaded portion lies within the insulation layer and the threaded portion within the substrate.

16. An assembly as set forth in claim 1, wherein said plate has a circular form and is fabricated of a zinc alloy.

17. An assembly as set forth in claim 16, wherein said plate has a circular opening and annular corrugations concentric therewith to render the plate flexure resistant.

18. In combination with a roof deck formed by a structural composite board or other drillable board, a membrane covering the deck, and at least one anchor and bearing plate assembly fastening the membrane to the deck, said assembly comprising:

(a) a bearing plate having an opening therein resting of the membrane; and (b) a self-drilling anchor formed by an externally threaded shank section which is insertable in the opening, and is provided at its upper end with a tool-turnable enlarged head, and a drill section extending from the lower end of the shank section which when the anchor is turned in, drills a hole in the deck which is then tapped by the shank section to secure the anchor to the deck, said bearing plate being provided with ratchet teeth surrounding the opening and said anchor head being provided with a finger engageable with said teeth to prevent turning out of the anchor.

* * * * *